US012013535B2

(12) United States Patent
Tohara et al.

(10) Patent No.: US 12,013,535 B2
(45) Date of Patent: Jun. 18, 2024

(54) OPTICAL SYSTEM AND IMAGE DISPLAY APPARATUS PROVIDED THEREWITH

(71) Applicant: CANON KABUSHIKI KAISHA, Tokyo (JP)

(72) Inventors: Masakazu Tohara, Tokyo (JP); Ryoji Kondo, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 434 days.

(21) Appl. No.: 17/150,192

(22) Filed: Jan. 15, 2021

(65) Prior Publication Data
US 2021/0239969 A1 Aug. 5, 2021

(30) Foreign Application Priority Data
Jan. 31, 2020 (JP) .................. 2020-015849

(51) Int. Cl.
*G02B 27/01* (2006.01)
*G02B 5/30* (2006.01)
(Continued)

(52) U.S. Cl.
CPC ....... *G02B 27/0172* (2013.01); *G02B 5/3083* (2013.01); *G02B 13/18* (2013.01);
(Continued)

(58) Field of Classification Search
CPC ...... G02B 13/18; G02B 17/08; G02B 25/001; G02B 2027/0123; G02B 2027/0132;
(Continued)

(56) References Cited

U.S. PATENT DOCUMENTS

| 6,005,644 A * | 12/1999 | Aruga .................. H04N 9/3105 349/8 |
| 2009/0273719 A1* | 11/2009 | Kuwata .................. G03B 33/12 345/522 |
| 2010/0254023 A1* | 10/2010 | Ito ........................ G02B 15/177 359/682 |
| 2010/0271702 A1* | 10/2010 | Zhou ..................... C08F 297/04 359/581 |

(Continued)

FOREIGN PATENT DOCUMENTS

| JP | 2015-075713 A | 4/2015 |
| JP | 2016-180938 A | 10/2016 |

(Continued)

OTHER PUBLICATIONS

Notice of Reasons for Refusal issued by the Japanese Patent Office on Sep. 19, 2023 in corresponding JP Patent Application No. 2020-015849, with English translation.

*Primary Examiner* — Thomas K Pham
*Assistant Examiner* — Kuei-Jen L Edenfield
(74) *Attorney, Agent, or Firm* — Carter, DeLuca & Farrell LLP

(57) ABSTRACT

The optical system introduces light from a display element displaying an image to an observer. The optical system includes in order from the display element toward the observer, a first phase plate, a semi-transmissive reflective surface, a lens, a second phase plate, and a polarization beam splitter configured to reflect a first linearly polarized light and transmit a second linearly polarized light whose polarization direction is orthogonal to that of the first linearly polarized light. The semi-transmissive reflective surface has a transmittance smaller than a reflectance thereof.

18 Claims, 6 Drawing Sheets

(51) Int. Cl.
*G02B 13/18* (2006.01)
*G02B 25/00* (2006.01)
*G02B 27/00* (2006.01)
*G02B 27/28* (2006.01)

(52) U.S. Cl.
CPC ....... *G02B 25/001* (2013.01); *G02B 27/0018* (2013.01); *G02B 27/283* (2013.01); *G02B 2027/012* (2013.01); *G02B 2027/0132* (2013.01)

(58) Field of Classification Search
CPC .......... G02B 2027/015; G02B 27/0018; G02B 27/283; G02B 26/00; G02B 5/3083; G02B 27/0172; G02B 2027/012; G02B 27/01; G02B 5/30; G02B 25/00; G02B 27/00; G02B 27/28
USPC .............. 359/630, 643, 648, 485.07, 485.02, 359/485.03, 489.074, 89.8, 489.11, 359/489.14, 484.04, 581, 583, 486.01, 359/487.04
See application file for complete search history.

(56) References Cited

U.S. PATENT DOCUMENTS

| | | | |
|---|---|---|---|
| 2012/0134030 A1* | 5/2012 | Weissman | G02B 25/001 359/727 |
| 2015/0346396 A1* | 12/2015 | Sugiyama | G02B 5/0257 204/157.6 |
| 2017/0269368 A1* | 9/2017 | Yun | G02B 27/144 |
| 2019/0018255 A1 | 1/2019 | Qin | |
| 2019/0079234 A1* | 3/2019 | Takagi | G02B 27/0101 |
| 2019/0384070 A1* | 12/2019 | Geng | G02B 27/28 |
| 2020/0158953 A1 | 5/2020 | Tohara et al. | |
| 2020/0183161 A1* | 6/2020 | Choi | G06T 19/006 |
| 2020/0192079 A1 | 6/2020 | Tohara et al. | |
| 2021/0231957 A1 | 7/2021 | Taketani et al. | |

FOREIGN PATENT DOCUMENTS

| | | |
|---|---|---|
| JP | 2018-503851 A | 2/2018 |
| JP | 2018-508800 A | 3/2018 |
| JP | 2019-053152 A | 4/2019 |
| WO | 2017/039715 A1 | 3/2017 |
| WO | 2018/178817 A2 | 10/2018 |

* cited by examiner

OPTICAL SYSTEM AND IMAGE DISPLAY APPARATUS PROVIDED THEREWITH

BACKGROUND OF THE INVENTION

Field of the Invention

The present invention relates to an image display apparatus enabling an observer to observe an image displayed on a display element through an optical system.

Description of the Related Art

As the above-mentioned image display apparatus, a head-mounted display (HMD) is provided that is mounted on an observer's head. In order to realize image presentation at a wide view angle in such an HMD, an ocular optical system that folds an optical path by utilizing polarization of light may be used. However, when a plastic lens is used for weight reduction in such an ocular optical system, a polarization state of light is disturbed by birefringence in the plastic lens, which results in generation of ghost.

Japanese Patent Laid-Open Nos. 2019-053152 and 2018-508800 each disclose an HMD having an ocular optical system providing a wide view angle by utilizing polarization of light. In the HMD disclosed in Japanese Patent Laid-Open Nos. 2019-053152, a direction of a transmission axis of a transflective polarizing plate in the ocular optical system is matched with a direction in which both eyes of the observer are lined up to reduce brightness unevenness. Further, in the HMD disclosed in Japanese Patent Laid-Open No. 2018-508800, a wide view angle is realized by using a polarizing element having a curved surface shape.

However, Japanese Patent Laid-Open No. 2019-053152 only describes that, to reduce ghost due to birefringence in a plastic lens of the ocular optical system, a plastic material having a small birefringence is used. Further, Japanese Patent Laid-Open No. 2018-508800 describes that a marginal light amount is reduced by vignetting of the ocular optical system, but does not describe reduction of ghost generated by lens's birefringence.

SUMMARY OF THE INVENTION

The present invention provides an optical system and an image display apparatus capable of reducing ghost in an optical system using polarization of light.

The present invention provides as an aspect thereof an optical system configured to introduce light from a display element displaying an image to an observer. The optical system includes in order from the display element toward the observer, a first phase plate, a semi-transmissive reflective surface, a lens, a second phase plate, and a polarization beam splitter configured to reflect a first linearly polarized light and transmit a second linearly polarized light whose polarization direction is orthogonal to that of the first linearly polarized light. The semi-transmissive reflective surface has a transmittance smaller than a reflectance thereof.

The present invention provides as another aspect thereof an image display apparatus including the above optical system.

Further features of the present invention will become apparent from the following description of exemplary embodiments with reference to the attached drawings.

DESCRIPTION OF THE EMBODIMENTS

Exemplary embodiments of the present invention will hereinafter be described with reference to the accompanying drawings.

Embodiment 1

Figure 1:
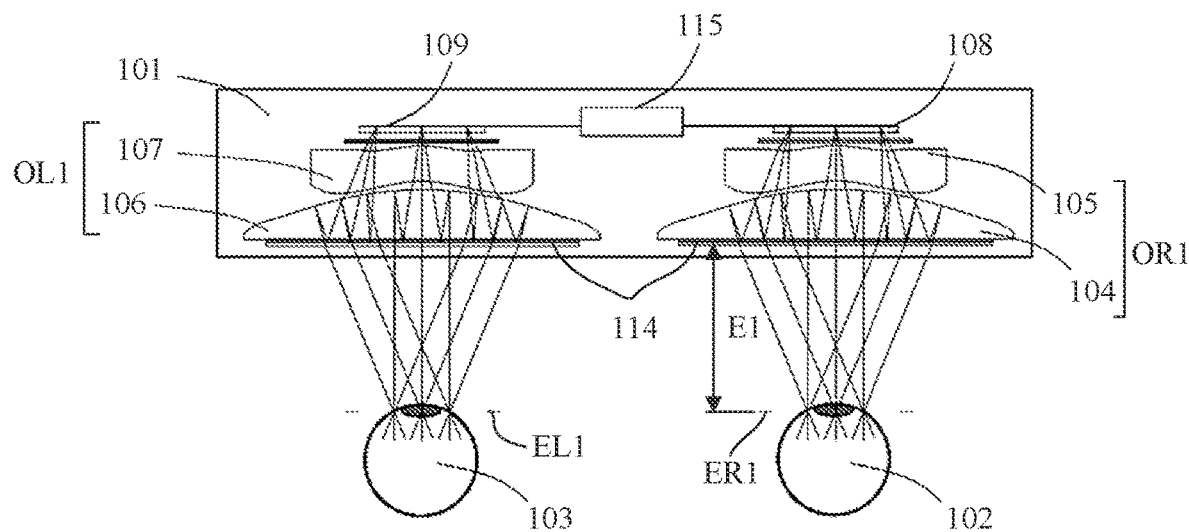
FIG. 1 illustrates a configuration of an HMD of Embodiment 1 of the present invention.

FIG. 1 illustrates a configuration of an HMD 101 as an image display apparatus (or an image observation apparatus) that is a first embodiment (Embodiment 1) of the present invention. The HMD 101 is mounted (worn) on an observer's head. Reference numeral 102 denotes an observer's right eye, and reference numeral 103 denotes an observer's left eye. Display lenses 104 and 105 are included in a right-eye ocular optical system OR1, and display lenses 106 and 107 are included in a left-eye ocular optical system OL1. Each ocular optical system is a coaxial optical system including multiple (two) display lenses. The observer's night eye 102 is disposed at an exit pupil ER1 of the right-eye ocular optical system OR1, and the observer's left eye 103 is disposed at an exit pupil EL1 of the left-eye ocular optical system OL1.

Figure 3:
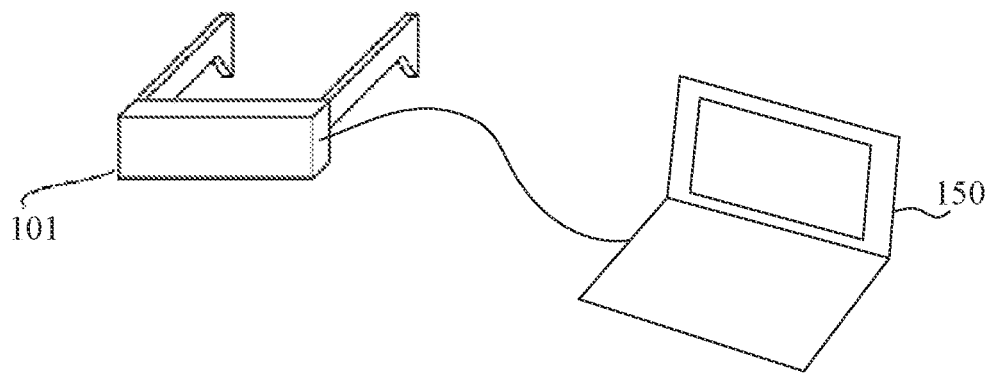
FIG. 3 is an external view of the HMD of Embodiment 1.

Reference numeral 108 denotes a right-eye display element, and reference numeral 109 denotes a left-eye display element. Each display element is a flat plate display element. In this embodiment, an organic EL (Electro-Luminescence) display panel is used as each display element. FIG. 3 illustrates an external view of the HMD 101 and a personal computer 150 connected to the HMD 101. Each display element displays a display image (original image) corresponding to an image signal output from the personal computer 150.

The ocular optical systems OR1 and OL1 respectively introduce lights from the display elements 108 and 109 to the exit pupils ER1 and EL1 to project magnified virtual images of the display images onto the observer's right eye 102 and left eye 103. As a result, the observer can observe the virtual images of the display images displayed on the display elements 108 and 109 through the ocular optical systems OR1 and OL1.

In this embodiment, each ocular optical system has a focal length of 12 mm, a horizontal display view angle of 45°, a vertical display view angle of 34°, and a diagonal display view angle of 54°. An eye relief E1 that is a distance between a most exit pupil-side (most observer-side) surface of each ocular optical system (that is, an exit pupil-side surface of a polarization beam splitter 114 described later) and the exit pupil of each ocular optical system is 18 mm.

Figure 2:
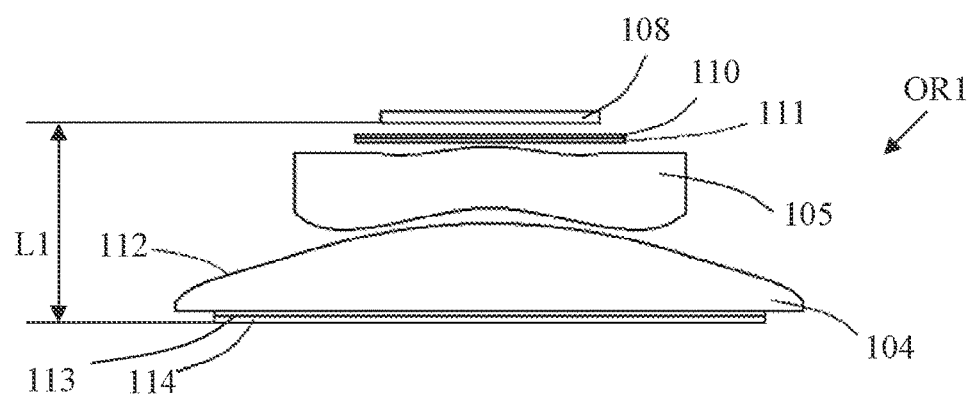
FIG. 2 illustrates a configuration of an ocular optical system in Embodiment 1.

Each of the right-eye and left-eye ocular optical systems OR1 and OL1 in this embodiment is an optical system that folds an optical path by utilizing polarization of light. Description will hereinafter be made of a configuration of the right-eye ocular optical system OR1. The left-eye ocular optical system OL1 has the same configuration as that of the right-eye ocular optical system OR1. As illustrated in FIG. 2, the right-eye ocular optical system OR1 includes, in order from the right-eye display element 108 toward the exit pupil ER1 (that is, toward the observer), a polarizing plate 110, a first λ/4 plate (first phase plate) 111, the display lens 105, the display lens 104, a second λ/4 plate (second phase plate) 113, and the polarization beam splitter (hereinafter referred to as "PBS") 114. On a display element-side convex surface of the display lens 104, a half mirror 112 as a semi-transmissive reflective surface is formed by vapor deposition. Further, the second λ/4 plate 113 and the PBS 114 are provided so as to be laminated on an exit pupil-side surface of the display lens 104.

The polarizing plate 110, the first λ/4 plate 111, the second λ/4 plate 113 and the PBS 114 are all formed in a flat plate shape. A polarization direction of a first linearly polarized light to be transmitted through the polarizing plate 110 is tilted with respect to a slow axis of the first λ/4 plate 111 by 45°. The polarization direction of the first linearly polarized light to be transmitted through the polarizing plate 110 is tilted with respect to a slow axis of the second λ/4 plate 113 by −45°. In other words, the slow axis of the first λ/4 plate and the slow axis of the second λ/4 plate 113 are tilted to mutually opposite sides with respect to the polarization direction of the first linearly polarized light by the same angle. Further, the polarization direction of the first linearly polarized light to be transmitted through the polarizing plate 110 and a polarization direction of a second linearly polarized light to be transmitted through the PBS 114 are orthogonal to each other.

Non-polarized light emerging (emitted) from the right-eye display element 108 is transmitted through the polarizing plate 110 to become linearly polarized light. The linearly polarized light is transmitted through the first λ/4 plate 111 to become circularly polarized light. The circularly polarized light is transmitted through the display lens 105, the half mirror 112 and the display lens 104, and then is transmitted through the second λ/4 plate 113 to become the first linearly polarized light.

This first linearly polarized light has the polarization direction orthogonal to the polarization direction to be transmitted through the PBS 114, and therefore is reflected by the PBS 114, and then is transmitted through the second λ/4 plate 113 to become circularly polarized light. This circularly polarized light is transmitted through the display lens 104, is reflected by the half mirror 112, is transmitted through the display lens 104 again, and then is transmitted through the second λ/4 plate 113 to become the second linearly polarized light. This second linearly polarized light has the polarization direction that coincides with the polarization direction to be transmitted through the PBS 114, and therefore is transmitted through the PBS 114 to be introduced to the exit pupil ER1 (right eye 102). Light emitted from the left-eye display element 109 is similarly introduced to the exit pupil EL1 (left eye 103) by the left-eye ocular optical system OL1.

Such a configuration in which each ocular optical system folds the optical path utilizing the polarization of light enables making each ocular optical system thin in its optical axis direction, and enables shortening the focal length of each ocular optical system so as to be able to observe a wide-view angle image.

It is desirable that the HMD 101 be lightweight because the observer wears it on his/her head. Therefore, it is desirable that the display lenses included in the ocular optical system be made of a resin material having a specific gravity smaller than that of glass. Thus, also in this embodiment, the display lenses 104 to 107 are resin lenses.

Further, in this embodiment, the display lenses 104 and 106 that are most exit pupil-side lenses (that is, lenses closest to the observer) are each a plano-convex lens having a convex surface convex toward the display element, and the half mirror 112 is provided on the convex surface. This configuration realizes a wide view angle while thinning the ocular optical system. Moreover, the convex surfaces of the display lenses 104 and 106 each have an aspherical shape, which enhances their aberration correction effect. Furthermore, the display lenses 105 and 107 are each a resin-made double-sided aspherical lens, which enhances their aberration correction effect.

However, since the display lenses 105 and 107 have a small outer diameter, and therefore have a small influence on its weight, they may be each a glass lens. Further, if the total weight of the HMD 101 is within an allowable range, the display lenses 104 and 106 may also be glass lenses.

In the HMD 101 of this embodiment, it is desirable that the eye relief E1 be 15 mm or more such that an observer wearing glasses can wear the HMD 101. However, if the eye relief is too long, the outer shape of the display lens becomes large, and thereby the size of the HMD 101 also becomes large. Therefore, it is desirable that the eye relief E1 be 25 mm or less. That is, it is desirable that the eye relief E1 satisfy the following condition:

$$15 \text{ mm} \leq E1 \leq 25 \text{ mm}. \tag{1}$$

Figure 4:
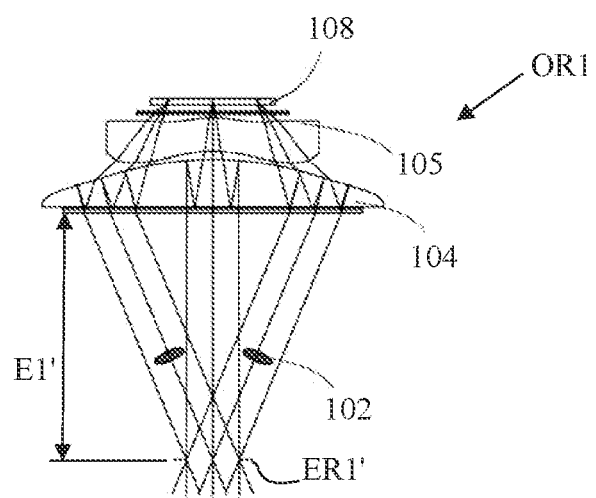
FIG. 4 illustrates an optical path of the ocular optical system in Embodiment 1.

Further, in the HMD 101 of this embodiment, as illustrated in FIG. 4, in a state where an eyeball (pupil) of the right eye 102 faces (sees) most edge portions in a right-and-left direction of a display surface of the right-eye display element 108, a position of an exit pupil ER1' of the right-eye ocular optical system OR1, that is, an eye relief E1' is set to 28 mm. This eye relief E1' (=28 mm) is the sum of the eye relief E1 (=18 mm) when the eyeball faces the center of the display surface as illustrated in FIG. 1 and a rotation radius of 10 mm of the eyeball. An exit pupil diameter is set to 6 mm. The same applies to the exit pupil of the left-eye ocular optical system OL1. Such setting makes it possible to cause light from a direction in which the eyeball faces to enter the eyeball even if the eyeball is rotated to observe the left and right edge portions (similarly, upper and lower edge portions) of the display surface.

Next, description will be made of generation of ghost light as unwanted light in the ocular optical systems OR1 and OL1 in this embodiment with reference to FIG. 5. The description will be made using the right-eye ocular optical system OR1, and the same applies to the left-eye ocular optical system OL1.

Figure 5:
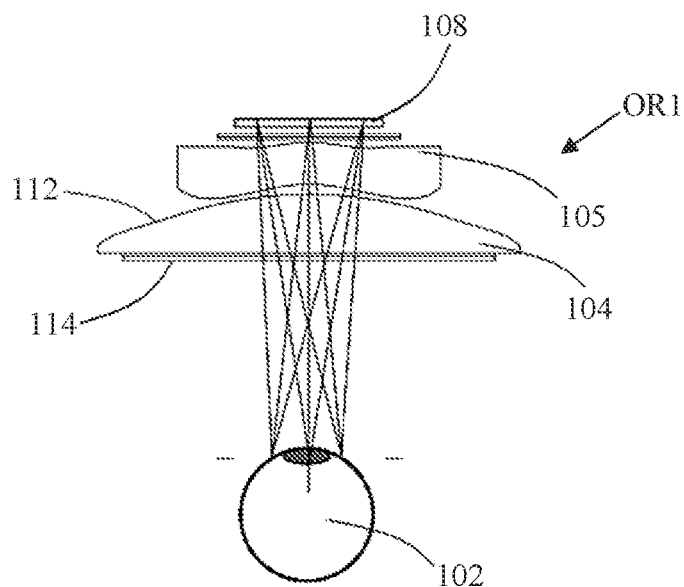
FIG. 5 illustrates ghost light of the ocular optical system in Embodiment 1.

In the ocular optical system OR1 in this embodiment utilizing the polarization of light, due to birefringence in the display lenses 104 and 105 and polarization characteristics of the polarizing plate 110, λ/4 plates 111 and 113 and PBS 114, light emitted from the display element 108 may be introduced to the observer's right eye 102 without being reflected by the PBS 114 as illustrated in FIG. 5, which is not a normal optical path illustrated in FIGS. 1 and 4. This light becomes the ghost light generating ghost.

This ghost light is generated as follows. The circularly polarized light transmitted through the first λ/4 plate 111 becomes an elliptically polarized light by the birefringence in the display lenses 105 and 104. The elliptically polarized light is transmitted through the second λ/4 plate 113 to become a linearly polarized light whose polarization direction is tilted with respect to its original polarization direction, and then is transmitted through the PBS 114 to be introduced as the ghost light to the right eye 102. Further, even if there is no birefringence in the display lenses 104 and 105, the ghost light is generated when the polarization characteristics of the polarizing plate 110, λ/4 plates 111 and 113 and PBS 114 are not good.

In this embodiment, to reduce such ghost light, a transmittance T1 of the half mirror 112 is set lower than a reflectance R1 thereof. Specifically, the reflectance R1 is set to 70%, and the transmittance T1 is set to 30%. As can be seen from FIG. 5, the ghost light is only transmitted through the half mirror 112 and is not reflected thereby. Therefore, setting the transmittance T1 of the half mirror 112 to be lower than the reflectance R1 can lower the intensity of the ghost light.

Figure 6:
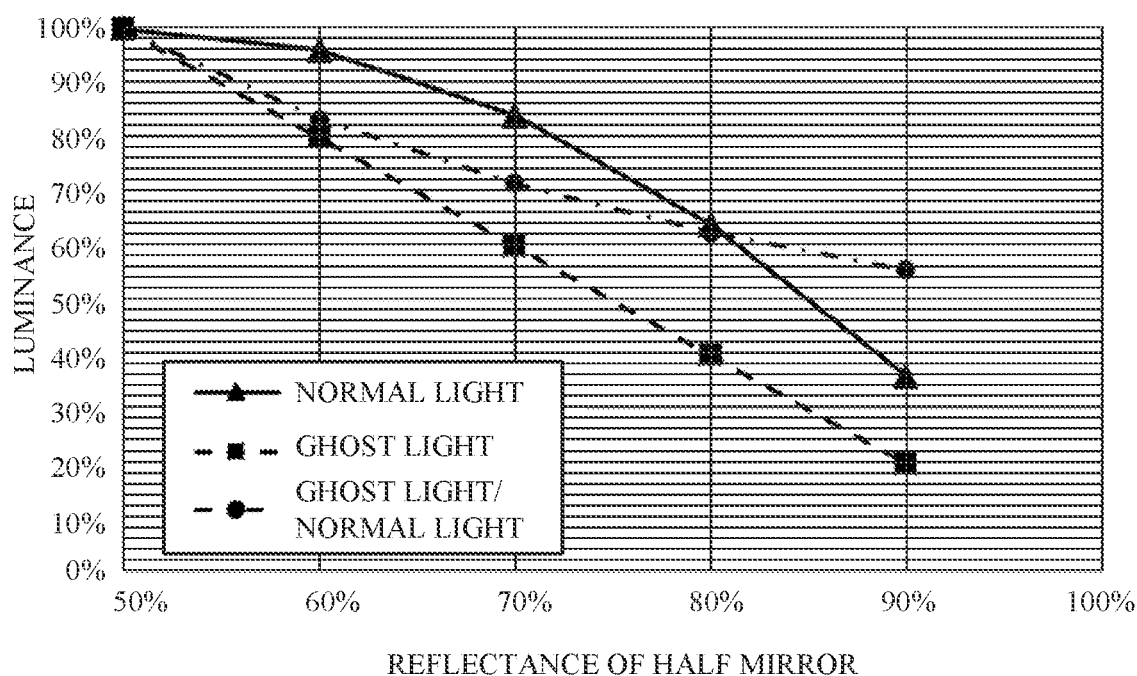
FIG. 6 illustrates a relation between reflectance and brightness of a half mirror of the ocular optical system in Embodiment 1.

FIG. 6 illustrates a relation between the reflectance R1 of the half mirror 112 and luminances of normal light traveling along the normal optical path and the ghost light. As the reflectance R1 of the half mirror 112 increases, both the luminance of the normal light (solid line) and the luminance of the ghost light (broken line) decrease. However, since the luminance of the ghost light further decreases compared to the luminance of the normal light, a ratio (dashed-dotted line) of the luminance of the ghost light to that of the normal light decreases. In this embodiment, compared to the case of using a general half mirror whose reflectance and transmittance are each 50%, the ratio of the luminance of the ghost light to the luminance of the normal light can be reduced by about 30%.

In this embodiment, it is desirable that the transmittance T1 of the half mirror 112 satisfy the following condition:

$$15\% \leq T1 \leq 45\%. \quad (2)$$

And it is desirable that the reflectance R1 of the half mirror 112 satisfy the following condition:

$$55\% \leq R1 \leq 85\%. \quad (3)$$

When the transmittance T1 exceeds 45% (and the reflectance R1 is less than 55%), the intensity of the ghost light cannot be sufficiently reduced. On the other hand, when the transmittance T1 is less than 15% (and the reflectance R1 exceeds 85%), the luminance of the normal light becomes too low, which makes it impossible to observe a natural image formed by the normal light.

Further, it is more desirable that the transmittance T1 of the half mirror 112 satisfy the following condition:

$$15\% \leq T1 \leq 35\%. \quad (2a)$$

And it is more desirable that the reflectance R1 of the half mirror 112 satisfy the following condition:

$$65\% \leq R1 \leq 85\%. \quad (3a)$$

The transmittance T1 and the reflectance R1 of the half mirror 112 in this embodiment are numerical values in a visible wavelength range. When the transmittance and the reflectance are different for each wavelength, they may be average values, or may be a transmittance and a reflectance for a typical wavelength at which a spectral luminous efficiency is high such as a green wavelength. When the transmittance T1 and the reflectance R1 of the half mirror 112 differ depending on the incident angle of light to the half mirror 112, a transmittance and a reflectance when the incident angle is 0° may be used as the transmittance T1 and the reflectance R1, or a transmittance and a reflectance for the incident light of the ghost light may be used as the transmittance T1 and the reflectance R1.

In this embodiment, the half mirror 112 includes a silver layer (that is, a layer formed of silver). As a result, fluctuation in transmittance and reflectance depending on the polarization state can be reduced. In an optical system utilizing polarization of light such as the ocular optical system in this embodiment, the fluctuation in transmittance and reflectance depending on the polarization state may cause a large light amount loss. Therefore, it is desirable that the half mirror 112 include a metal layer causing little fluctuation in transmittance and reflectance depending on the polarization state. It is desirable to use, as the metal layer, the silver layer that causes little light amount loss due to absorption.

Further, in this embodiment, since the transmittance of the half mirror 112 is lower than the reflectance, the silver layer has a thickness (film thickness) larger than usual. Increasing the thickness of the silver layer makes it possible to stably form the film, and thereby makes it possible to improve durability thereof.

Furthermore, a dielectric multilayer film may be provided between the silver layer of the half mirror 112 and the display lens 104 as a resin lens in order to improve adhesion between the silver layer and the resin lens. In addition, a dielectric multilayer film may be provided on the silver layer's surface opposite to the display lens 104 in order to improve the durability of the silver layer.

Birefringence in a lens generally increases from its central portion to its marginal portion. Therefore, the intensity of the ghost light due to the birefringence of the display lenses 104 and 105 also increases from their central portion to their marginal portion. Thus, in order to more effectively reduce the ghost light passing through the display lenses 104 and 105, the transmittance of the half mirror 112 in its marginal portion may be set to be lower than that in a portion near its center (optical axis).

Specifically, as illustrated in FIG. 5, the ghost light emitted from the display element 108 is transmitted through a central area of the half mirror 112; the central area is an area from the center to 25% of an optically effective area of the half mirror 112. Therefore, the transmittance in the near-center portion of the optical effective area of the half mirror 112 may be set to 40% (the reflectance may be set to 60%), and the transmittance in a marginal area outside than the near-center portion of the optical effective area may be set to 30% (the reflectance may be set to 70%). In this case, the transmittance may be gradually reduced from the near-center portion to a portion near 25% of the optically effective area. On the other hand, since the ghost light is not transmitted through an outside area further outside than 25% of the optically effective area, the transmittance of the outside area may be set larger than 40% in order to improve the luminance of the normal light.

As can be seen from FIG. 1, the normal light is transmitted through an area from the center to 80% of the optically effective area of the half mirror 112, and the normal light is only reflected in an area further outside than the center-to-80% area. Therefore, in order to improve brightness of a marginal portion of the observed image, the reflectance in the area further outside than the center-to-80% area of the optically effective area of the half mirror 112 may be set higher than the reflectance in the center-to-80% area.

Specifically, the reflectance in the center-to-80% area of the optically effective area of the half mirror 212 may be set to 70% (the transmittance may be set to 30%), and the reflectance in the area further outside than the center-to-80% area may be set to 85% (the transmittance may be set to 15%). In this case, if the reflectance sharply increases in the area further outside than the center-to-80% area of the optically effective area, an unnatural image is observed due to the difference in reflectance, so that it is desirable that the reflectance be gradually increased in the area further outside than the center-to-80% area.

Further, the transmittance of the half mirror 112 may be increased as the incident angle of light to the half mirror 112 increases. As can be seen from FIG. 5, the incident angle of the ghost light emitted from the display element 108 to the half mirror 112 is 5° or less. On the other hand, as can be seen from FIGS. 1 and 4, the incident angle of the normal light to the half mirror 112 is from 0° to 60°. Therefore, in this embodiment, the transmittance of the half mirror 112 at the incident angle of 0° is set to 30%, and the transmittance thereof at the incident angle of 60° is set to 45%, which makes it possible to improve the luminance of the marginal portion while reducing the ghost light.

As described above, this embodiment can reduce the ghost in the HMD 101 including the ocular optical system utilizing the polarization of light, which enables observation of a more natural image.

The birefringence in the lens is likely to occur when the lens is manufactured by metallic molding using a resin material. Further, the birefringence becomes larger as an uneven thickness ratio of the lens becomes larger because the difference between temperatures of a thin portion and a thick portion of the lens during cooling after the metallic molding increases.

In the ocular optical system OR1 in this embodiment as a wide view angle and thin ocular optical system, the uneven thickness ratio of the display lens 104 provided with the reflective surface (half mirror 112) having a largest optical power becomes large. The uneven thickness ratio in an optically effective area of the display lens 104 is 2.0, which is desirable to be 1.5 or more and 4.0 or less. When the uneven thickness ratio is less than 1.5, it becomes necessary that the display lens 104 have a reduced optical power, which increases the radius of curvature or thickness of the display lens 104.

The reduced optical power of the display lens 104 makes it impossible to realize a wide view angle, or makes it necessary to add a lens having a large optical power and thereby makes it impossible to reduce the thickness of the ocular optical system OR1. Further, the increased thickness of the display lens 104 makes it impossible to reduce the thickness of the ocular optical system OR1. On the other hand, when the uneven thickness ratio is larger than 4.0, the birefringence of the display lens 104 becomes too large, and thereby the intensity of the ghost light increases.

When a thickness L1 of the ocular optical system OR1 is defined as a distance from the exit pupil-side surface of the PBS 114 to the display element 108, the thickness L1 is 13 mm, and a ratio L1/E1 of the thickness L1 and the eye relief E1 (=18 mm) is 0.72. It is desirable that the ratio L1/E1 satisfy the following condition (4) to secure an appropriate eye relief and to reduce the thickness of the ocular optical system OR 1:

$$0.60 \leq L1/E1 \leq 1.00. \quad (4)$$

When L1/E1 is smaller than 0.60, the eye relief becomes too long, and thereby the outer diameter of the display lens 104 becomes large, which undesirably increases the size of the HMD 101. Moreover, as the outer diameter of the display lens 104 increases, the birefringence thereof increases, so that the intensity of the ghost light increases. On the other hand, when L1/E1 is larger than 1.00, the thickness of the ocular optical system OR1 increases, which undesirably increases the size of the HMD 101, and the eye relief becomes too short, which undesirably gives the observer a feeling of tightness or undesirably makes it impossible for an observer wearing glasses to wear the HMD 101.

Further, in this embodiment, a maximum diagonal half-view angle θ1 of the ocular optical system OR1 is 27°. Thus, E1×tan θ1 is 9.2 mm. It is desirable that E1×tan θ1 satisfy the following condition (5) to secure an appropriate eye relief and to increase the display view angle of the ocular optical system OR1:

$$8 \text{ mm} \leq E1 \times \tan \theta 1 \leq 20 \text{ mm}. \quad (5)$$

When E1×tan θ1 is smaller than 8 mm, the eye relief becomes too short, which undesirably gives the observer a feeling of tightness or undesirably makes it impossible for the observer wearing glasses to wear the HMD 101. In addition, the too short eye relief makes the display view angle of the ocular optical system too narrow, which makes it impossible for the observer to observe a natural image with a sense of presence. On the other hand, when E1×tan θ1 is larger than 20 mm, the eye relief becomes too long, and thereby the outer diameter of the display lens 104 becomes large, which undesirably increases the size of the HMD 101. Moreover, as the outer diameter of the display lens 104 increases, the birefringence of the display lens 104 increases, so that the intensity of the ghost light increases.

Further, to reduce the ghost light due to external light and thereby to increase contrast of the observed image, a polarizing plate may be disposed between the PBS 114 and the exit pupil of each ocular optical system.

Moreover, in this embodiment, as illustrated in FIG. 2, the exit pupil-side surface of the display lens 104 on which the second λ/4 plate 113 and the PBS 114 are formed so as to be laminated is made as a planar surface. This is to increase the eye relief and to reduce the thickness of the ocular optical system. If this surface has a concave shape toward the exit pupil, the display lens 104 becomes thicker in order to secure the eye relief in the marginal portion thereof. On the other hand, if this surface has a convex shape toward the exit pupil, the display lens 104 becomes thicker in order to secure the thickness of a lens edge portion of the display lens 104.

The conditions (1) to (5) described in this embodiment also apply to Embodiments 2 and 3 described later. Further, the desirable material, shape, uneven thickness ratio and the like of each lens described in this embodiment also apply to Embodiments 2 and 3.

As the display element, a liquid crystal display panel that emits linearly polarized light may be used. In this case, the polarizing plate 110 can be omitted, and thereby the ocular optical system and the HMD can be further thinned. This is also the same in Embodiments 2 and 3.

Embodiment 21

Figure 7:
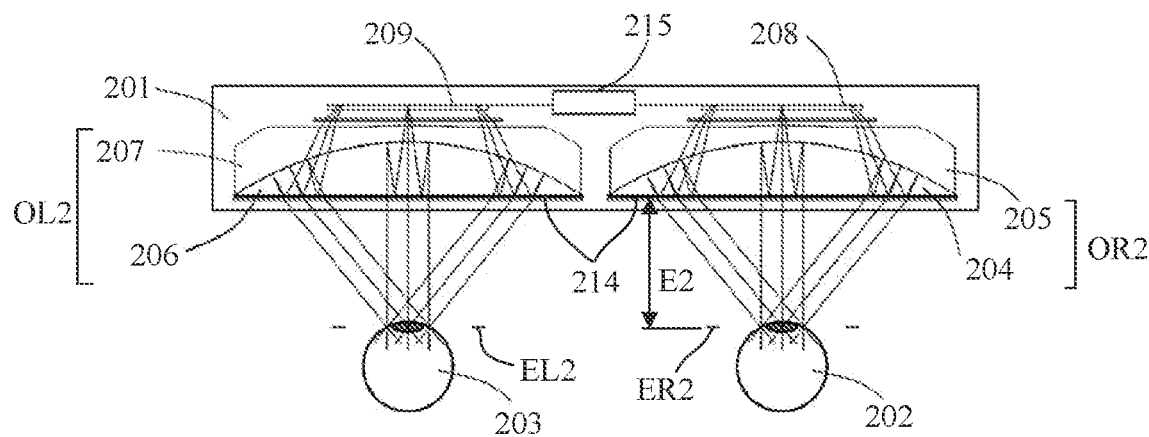
FIG. 7 illustrates a configuration of an HMD of Embodiment 2 of the present invention.

FIG. 7 illustrates a configuration of an HMD 201 that is a second embodiment (Embodiment 2) of the present invention. Reference numeral 202 denotes an observer's right eye, and reference numeral 203 denotes an observer's left eye.

Display lenses 204 and 205 are included in a right-eye ocular optical system OR2, and display lenses 206 and 207 are included in a left-eye ocular optical system OL2. Each ocular optical system is a coaxial optical system including the two display lenses. The observer's right eye 202 is disposed at an exit pupil ER2 of the right-eye ocular optical system OR2, and the observer's left eye 203 is disposed at an exit pupil EL2 of the left-eye ocular optical system OL2.

Reference numeral 208 denotes a right-eye display element, and reference numeral 209 denotes a left-eye display element. Each display element is a flat plate display element. In this embodiment, the display element is an organic EL display panel. Each display element displays a display image (original image) corresponding to an image signal output from a personal computer (not illustrated).

The ocular optical systems OR2 and OL2 respectively introduce lights from the display elements 208 and 209 to the exit pupils ER2 and EL2 to project magnified virtual images of the display images (original images) onto the observer's right eye 202 and left eye 203. As a result, the observer can observe the virtual images of the display images displayed on the display elements 208 and 209 through the ocular optical systems OR2 and OL2.

In this embodiment, each ocular optical system has a focal length of 13 mm, a horizontal display view angle of 60°, a vertical display view angle of 60°, and a diagonal display view angle of 78°. An eye relief E2 that is a distance between a most exit pupil-side surface of each ocular optical system (that is, an exit pupil-side surface of a polarization beam splitter 214 described later) and the exit pupil of each ocular optical system is 20 mm.

Figure 8:
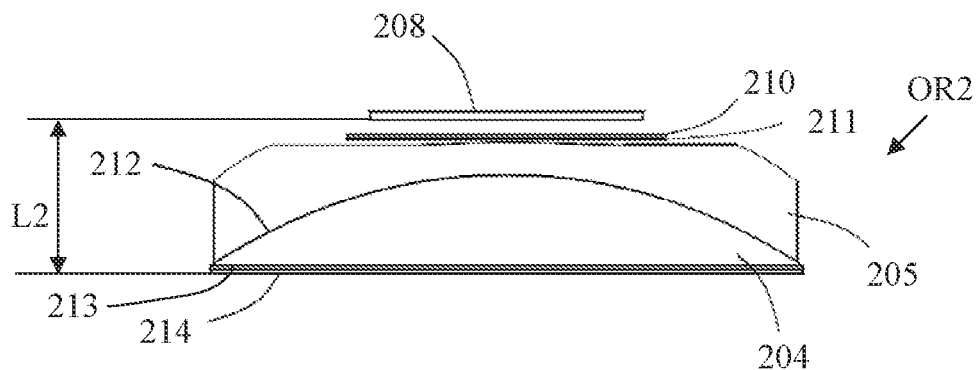
FIG. 8 illustrates a configuration of an ocular optical system in Embodiment 2.

Each of the right-eye and left-eye ocular optical systems OR2 and OL2 in this embodiment is, as in Embodiment 1, an optical system that folds an optical path by utilizing polarization of light. Description will hereinafter be made of a configuration of the right-eye ocular optical system OR2. The left-eye ocular optical system OL2 has the same configuration as that of the right-eye ocular optical system OR2. As illustrated in FIG. 8, the right-eye ocular optical system OR2 includes, in order from the right-eye display element 208 toward the exit pupil ER2, a polarizing plate 210, a first λ/4 plate 211, the display lens 205, the display lens 204, a second λ/4 plate 213, and the polarization beam splitter (hereinafter referred to as "PBS") 214. On a display element-side convex surface of the display lens 204, a half mirror 212 as a semi-transmissive reflective surface is formed by vapor deposition. Further, the second λ/4 plate 213 and the PBS 214 are provided so as to be laminated on an exit pupil-side surface of the display lens 204.

The polarizing plate 210, the first λ/4 plate 211, the second λ/4 plate 213 and the PBS 214 are all formed in a flat plate shape. A polarization direction of a first linearly polarized light to be transmitted through the polarizing plate 210 is tilted with respect to a slow axis of the first λ/4 plate 211 by 45°. The polarization direction of the first linearly polarized light to be transmitted through the polarizing plate 210 is tilted with respect to a slow axis of the second λ/4 plate 213 by −45°. Further, the polarization direction of the first linearly polarized light to be transmitted through the polarizing plate 210 and a polarization direction of a second linearly polarized light to be transmitted through the PBS 214 are orthogonal to each other.

Non-polarized light emitted from the right-eye display element 208 is transmitted through the polarizing plate 210 to become linearly polarized light. The linearly polarized light is transmitted through the first λ/4 plate 211 to become circularly polarized light. The circularly polarized light is transmitted through the display lens 205, the half mirror 212 and the display lens 204, and then is transmitted through the second λ/4 plate 213 to become the first linearly polarized light.

This first linearly polarized light has the polarization direction orthogonal to the polarization direction to be transmitted through the PBS 214, and therefore is reflected by the PBS 214, and then is transmitted through the second λ/4 plate 213 to become circularly polarized light. This circularly polarized light is transmitted through the display lens 204, is reflected by the half mirror 212, is transmitted through the display lens 204 again, and then is transmitted through the second λ/4 plate 213 to become the second linearly polarized light. This second linearly polarized light has the polarization direction that coincides with the polarization direction to be transmitted through the PBS 214, and therefore is transmitted through the PBS 214 to be introduced to the exit pupil ER2 (right eye 202). Light emitted from the left-eye display element 20) is also introduced to the exit pupil EL2 (left eye 203) by the left-eye ocular optical system OL2.

Also in this embodiment, as in Embodiment 1, the configuration in which each ocular optical system folds the optical path utilizing the polarization of light enables making each ocular optical system thin, and enables shortening the focal length of each ocular optical system so as to be able to observe a wide view angle image.

Further, in this embodiment, the two display lenses included in each ocular optical system are cemented to each other, and thereby a thickness of each ocular optical system in its optical axis direction is reduced to 13.5 mm. In addition, using the two display lenses as a cemented lens facilitates holding the display lenses by a main body of the HMD 201.

Furthermore, also in this embodiment, the display lenses 204 to 207 are resin lenses, and the display lenses 204 to 207 are aspherical lenses, which enhances their aberration correction effect.

Moreover, since the display lenses 204 and 205 form a cemented lens, the half mirror 212 may be provided on an exit pupil-side surface of the display lens 205. Even in this case, the surface on which the half mirror 212 is provided is a convex surface toward the display element 208.

In addition, in the HMD 201 of this embodiment, in a state where an eyeball (pupil) of the right eye 202 faces (sees) most edge portions in a right-and-left direction (hereinafter simply referred to as "left and right edge portions") of a display surface of the right-eye display element 208, a position of the exit pupil of the right-eye ocular optical system OR2, that is, an eye relief is set to 30 mm. This eye relief of 30 mm is the sum of the eye relief E2 (=20 mm) when the eyeball faces the center of the display surface as illustrated in FIG. 7 and a rotation radius of 10 mm of the eyeball. An exit pupil diameter is set to 6 mm. The same applies to the exit pupil of the left-eye ocular optical system OL1.

Such setting makes it possible to cause light from a direction in which the eyeball faces to enter the eyeball even if the eyeball is rotated to observe the left and right edge portions (similarly, upper and lower edge portions) of the display surface.

Figure 9:
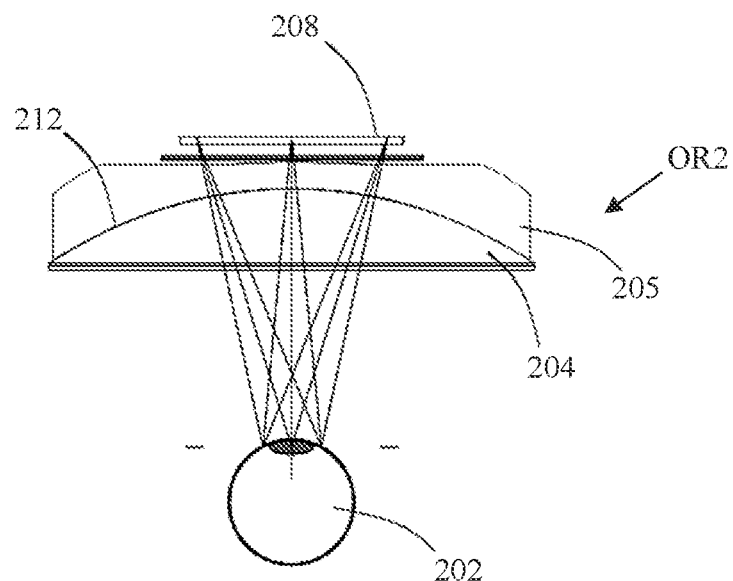
FIG. 9 illustrates ghost light of the ocular optical system in Embodiment 2.

As illustrated in FIG. 9, also in the ocular optical systems OR2 and OL2 in this embodiment, the ghost light is generated for the same reason as in Embodiment 1. Thus, also in this embodiment, a transmittance T2 of the half mirror 212 is set to be lower than a reflectance R2 thereof to reduce the ghost light. Specifically, the reflectance R2 is set to 75%, and the transmittance T2 is set to 25%. As can be seen from FIG. 9, the ghost light only is transmitted through the half mirror 212 and is not reflected thereby. Therefore, setting the transmittance T2 of the half mirror 212 to be lower than the reflectance R2 enables lowering the intensity of the ghost light. As illustrated in FIG. 6, compared to the case of using the general half mirror whose reflectance and transmittance are each 50%, the ratio of the ghost light to the normal light can be reduced by about 35% in this embodiment.

The relation between the transmittance T2 and the reflectance R2 of the half mirror 212 in this embodiment and the wavelength and the incident angle is the same as that of Embodiment 1. Further, as in Embodiment 1, the half mirror 212 in this embodiment includes the silver layer, and is desirable to be provided with the dielectric multilayer film.

Also in this embodiment, in order to more effectively reduce the ghost light passing through the display lenses 204 and 205, the transmittance of the half mirror 212 in its marginal portion may be lower than that of the near-center (optical axis) portion.

Specifically, as illustrated in FIG. 9, the ghost light emitted from the display element 208 is transmitted through a central area of the half mirror 212; the central area is an area from the center to 40% of an optically effective area of the half mirror 212. Therefore, the transmittance in the near-center portion of the optical effective area of the half mirror 212 may be set to 40% (the reflectance may be set to 60%), and the transmittance in a marginal area from near the center to 40% of the optical effective area may be set to 25% (the reflectance may be set to 75%). In this case, the transmittance may be gradually reduced from near the center to near 40% of the optically effective area. On the other hand, since the ghost light is not transmitted through an outside area further outside than 40% of the optically effective area, the transmittance of the outside area may be set larger than 40% in order to improve the luminance of the normal light.

As can be seen from FIG. 7, the normal light is transmitted through an area from the center to 85% of the optically effective area of the half mirror 212, and the normal light is only reflected in an area further outside than the center-to-85% area. Therefore, in order to improve brightness of a marginal portion of the observed image, the reflectance in the area further outside than the center-to-85% area of the optically effective area of the half mirror 212 may be set higher than the reflectance in the center-to-85% area. Specifically, the reflectance in the center-to-85% area of the optically effective area of the half mirror 212 may be set to 75% (the transmittance may be set to 25%), and the reflectance in the area further outside than the center-to-85% area may be set to 85% (the transmittance may be set to 15%). In this case, for the same reason as in Embodiment 1, it is desirable that the reflectance in the area further outside than the center-to-85% area be gradually increased.

As described above, this embodiment also can reduce the ghost in the HMD 201 including the ocular optical system utilizing the polarization of light, which enables observation of a more natural image.

Further, also in the right-eye ocular optical system OR2 in this embodiment as a wide view angle and thin ocular optical system, an uneven thickness ratio of the display lens 204 provided with the reflective surface (half mirror 212) having a largest optical power becomes large. Since the display lenses 204 and 205 are cemented to each other, the radius of curvature of the cemented surface of the display lens 205 with the display lens 204 is short, and thereby the display lens 205 has a large uneven thickness ratio. The uneven thickness ratio in an optically effective area of the display lens 204 is 3.6, and the uneven thickness ratio in an optically effective area of the display lens 205 is 2.8.

When a thickness L2 of the right-eye ocular optical system OR2 is defined as a distance from the exit pupil-side surface of the PBS 214 to the right-eye display element 208, the thickness L2 is 13.5 mm. The eye relief E2 of the right-eye ocular optical system OR2 is 20 mm as described above, and thus a ratio L2/E2 of the thickness L2 and the eye relief E2 is 0.68.

In this embodiment, a maximum diagonal half-view angle θ2 of the right-eye ocular optical system OR2 is 39°. Thus, E2×tan θ2 is 16.2 mm, which satisfies the condition (5). The same applies to the uneven thickness ratio, L2/E2 and E2×tan θ2 of the left-eye ocular optical system OL2.

Further, also in this embodiment, to reduce the ghost light due to external light and thereby to increase contrast of the observed image, a polarizing plate may be disposed between the PBS 214 and the exit pupil of each ocular optical system.

Embodiment 3

Figure 10:
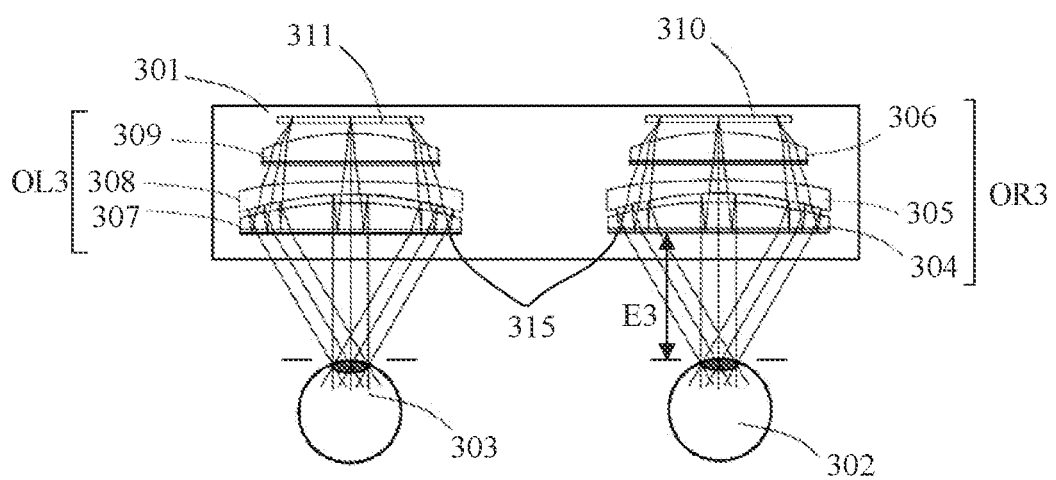
FIG. 10 illustrates a configuration of an HMD of Embodiment 3 of the present invention.

FIG. 10 illustrates a configuration of an HMD 301 that is a third embodiment (Embodiment 3) of the present invention. Reference numeral 302 denotes an observer's right eye, and reference numeral 303 denotes an observer's left eye. Display lenses 304, 305 and 306 are included in a right-eye ocular optical system OR3, and display lenses 307, 308 and 309 are included in a left-eye ocular optical system OL3. Each ocular optical system is a coaxial optical system including the three display lenses. The observer's right eye 302 is disposed at an exit pupil ER3 of the right-eye ocular optical system OR3, and the observer's left eye 303 is disposed at an exit pupil EL3 of the left-eye ocular optical system OL3.

Reference numeral 310 denotes a right-eye display element, and reference numeral 311 denotes a left-eye display element. Each display element is a flat plate display element. In this embodiment, the display element is an organic EL display panel. Each display element displays a display image (original image) corresponding to an image signal output from a personal computer (not illustrated).

The ocular optical systems OR3 and OL3 respectively introduce lights from the display elements 310 and 311 to the exit pupils ER3 and EL3 to project magnified virtual images of the display images (original images) onto the observer's right eye 302 and left eye 303. As a result, the observer can observe the virtual images of the display images displayed on the display elements 310 and 311 through the ocular optical systems OR3 and OL3.

In this embodiment, each ocular optical system has a focal length of 10.7 mm, a horizontal display view angle of 50°, a vertical display view angle of 38°, and a diagonal display view angle of 60°. An eye relief E3 that is a distance between a most exit pupil-side surface of each ocular optical system (that is, an exit pupil-side surface of a polarization beam splitter 316 described later) and the exit pupil of each ocular optical system is 15 mm.

Figure 11:
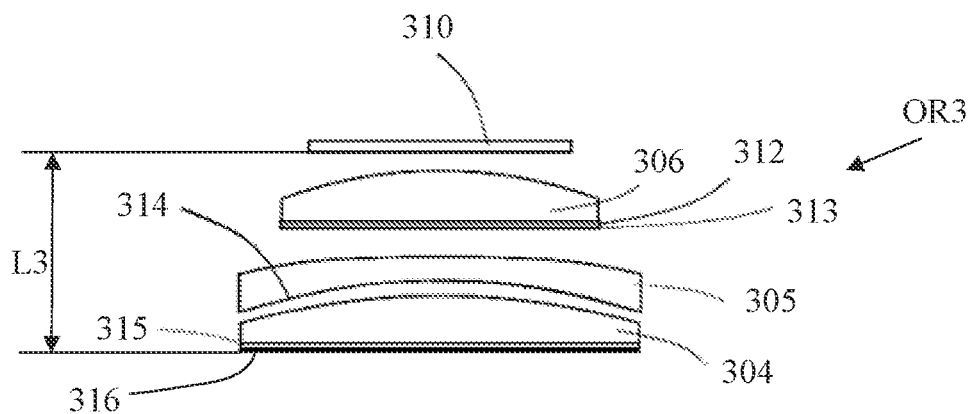
FIG. 11 illustrates a configuration of an ocular optical system in Embodiment 3.

Each of the right-eye and left-eye ocular optical systems OR3 and OL3 in this embodiment is, as in Embodiment 1, an optical system that folds an optical path by utilizing polarization of light. Description will hereinafter be made of a configuration of the right-eye ocular optical system OR3. The left-eye ocular optical system OL3 has the same configuration as that of the right-eye ocular optical system OR3. As illustrated in FIG. 11, the right-eye ocular optical system OR3 includes, in order from the right-eye display element 310 toward the exit pupil ER3, the display lens 306, a polarizing plate 312, a first λ/4 plate 313, the display lens 305, the display lens 304, a second λ/4 plate 315, and the polarization beam splitter (hereinafter referred to as "PBS") 316. The polarizing plate 312 is fixed to a display element-side surface of the display lens 306. On an exit pupil-side concave surface (convex surface toward the display element 310) of the display lens 306, a half mirror 314 as a semi-transmissive reflective surface is formed by vapor deposition. Further, the second λ/4 plate 315 and the PBS 316 are provided so as to be laminated on an exit pupil-side surface of the display lens 304.

The polarizing plate 312, the first λ/4 plate 313, the second λ/4 plate 315 and the PBS 316 are all formed in a flat plate shape. A polarization direction of a first linearly polarized light to be transmitted through the polarizing plate 312 is tilted with respect to a slow axis of the first λ/4 plate 313 by 45°. The polarization direction of the first linearly polarized light to be transmitted through the polarizing plate 312 is tilted with respect to a slow axis of the second λ/4 plate 315 by −45°. Further, the polarization direction of the first linearly polarized light to be transmitted through the polarizing plate 312 and a polarization direction of a second linearly polarized light to be transmitted through the PBS 316 are orthogonal to each other.

Non-polarized light emitted from the right-eye display element 310 is transmitted through the display lens 306, and then is transmitted through the polarizing plate 312 to become linearly polarized light. The linearly polarized light is transmitted through the first λ/4 plate 313 to become circularly polarized light. The circularly polarized light is transmitted through the display lens 305, the half mirror 314 and the display lens 304, and then is transmitted through the second λ/4 plate 315 to become the first linearly polarized light. This first linearly polarized light has the polarization direction orthogonal to the polarization direction to be transmitted through the PBS 316, and therefore is reflected by the PBS 316, and then is transmitted through the second λ/4 plate 315 to become circularly polarized light.

This circularly polarized light is transmitted through the display lenses 304 and 305, is reflected by the half mirror 314, is transmitted through the display lenses 304 and 305 again, and then is transmitted through the second λ/4 plate 315 to become the second linearly polarized light. This second linearly polarized light has the polarization direction that coincides with the polarization direction to be transmitted through the PBS 316, and therefore is transmitted through the PBS 316 to be introduced to the exit pupil ER3 (right eye 302). Light emitted from the left-eye display element 311 is also introduced to the exit pupil EL3 (left eye 303) by the left-eye ocular optical system OL3.

Also in this embodiment, as in Embodiment 1, the configuration in which each ocular optical system folds the optical path utilizing the polarization of light enables making each ocular optical system thin, and enables shortening the focal length of each ocular optical system so as to be able to observe a wide view angle image.

In this embodiment, each ocular optical system includes the three display lenses, and thereby a thickness thereof in its optical axis direction is reduced to 18 mm.

Further, also in this embodiment, the display lenses 304 to 309 are resin lenses, and the display lenses 304 to 309 are aspherical lenses, which enhances their aberration correction effect.

In this embodiment, the exit pupil of each ocular optical system is located at a position of 25 mm. This 25 mm is the sum of the eye relief 15 mm and a rotation radius of 10 mm of an eyeball. An exit pupil diameter is set to 4 mm. Such setting makes it possible to cause light from a direction in which the eyeball faces to enter the eyeball even if the eyeball is rotated to observe left and right edge portions (similarly, upper and lower edge portions) of the display surface.

Figure 12:
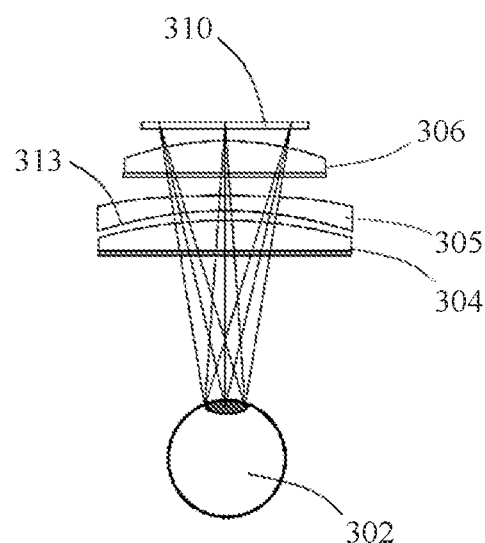
FIG. 12 illustrates ghost light of the ocular optical system in Embodiment 3.

As illustrated in FIG. 12, also in the ocular optical systems OR3 and OL3 in this embodiment, the ghost light is generated for the same reason as in Embodiment 1. Thus, also in this embodiment, a transmittance T3 of the half mirror 314 is set to be lower than a reflectance R3 thereof to reduce the ghost light. Specifically, the reflectance R3 is set to 65%, and the transmittance T3 is 35%. As can be seen from FIG. 12, the ghost light only is transmitted through the half mirror 314 and is not reflected thereby. Therefore, setting the transmittance T3 of the half mirror 314 to be lower than the reflectance R3 thereof enables lowering the intensity of the ghost light. As illustrated in FIG. 6, compared to the case of using the general half mirror whose reflectance and transmittance are each 50%, the ratio of the ghost light to the normal light can be reduced by about 20% in this embodiment.

The relation between the transmittance T3 and the reflectance R3 of the half mirror 314 and the wavelength and the incident angle in this embodiment is the same as that of Embodiment 1. Further, as in Embodiment 1, the half mirror 314 in this embodiment includes the silver layer, and is desirable to be provided with a dielectric multilayer film.

Also in this embodiment, as in Embodiment 1, in order to more effectively reduce the ghost light passing through the display lenses 304 to 306, the transmittance of the half mirror 314 in its marginal portion may be lower than that in the near-center (optical axis) portion.

Specifically, as illustrated in FIG. 12, the ghost light emitted from the display element 310 is transmitted through a central area of the half mirror 314; the central area is an area from the center to 50% of an optically effective area of the half mirror 314. Therefore, the transmittance in the near-center portion of the optical effective area of the half mirror 314 may be set to 35% (the reflectance may be set to 65%), and the transmittance in a marginal area from near the center to 50% of the optical effective area may be set to 15% (the reflectance may be set to 85%). In this case, the transmittance may be gradually reduced from near the center to near 50% of the optically effective area. On the other hand, since the ghost light is not transmitted through an outside area further outside than 50% of the optically effective area, the transmittance of the outside area may be set larger than 35% in order to improve the luminance of the normal light.

As described above, this embodiment also can reduce the ghost in the HMD 301 including the ocular optical system utilizing the polarization of light, which enables observation of a more natural image.

Further, also in the right-eye ocular optical system OR3 in this embodiment as a wide view angle and thin ocular optical system, an uneven thickness ratio of the display lens 305 provided with the reflective surface (half mirror 314) having a largest optical power becomes large. The uneven thickness ratio in an optically effective area of the display lens 305 is 1.6.

When a thickness L3 of the right-eye ocular optical system OR3 is defined as a distance from the exit pupil-side surface of the PBS 316 to the right-eye display element 310, the thickness L3 is 13.5 mm. The eye relief E3 of the right-eye ocular optical system OR3 is 15 mm as described above, and thus a ratio L3/E3 of the thickness L3 and the eye relief E3 is 0.9.

In this embodiment, a maximum diagonal half-view angle θ3 of the right-eye ocular optical system OR3 is 30°. Thus, E3×tan θ3 is 8.7 mm, which satisfies the condition (5). The same applies to the uneven thickness ratio, L3/E3 and E3×tan θ3 of the left-eye ocular optical system OL3.

Further, also in this embodiment, to reduce the ghost light due to external light and thereby to increase contrast of the observed image, a polarizing plate may be disposed between the PBS 316 and the exit pupil of each ocular optical system.

According to the above embodiments, the ghost generated in the ocular optical system utilizing the polarization of light can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-015849, filed on Jan. 31, 2020 which is hereby incorporated by reference herein in its entirety.

What is claimed is:

1. An optical system configured to introduce light from a display element displaying an image to an observer, the optical system comprising in order from the display element toward the observer:
   a first phase plate;
   a semi-transmissive reflective surface;
   a lens;
   a second phase plate; and
   a polarization beam splitter configured to reflect a first linearly polarized light and transmit a second linearly polarized light whose polarization direction is orthogonal to that of the first linearly polarized light,
   wherein the semi-transmissive reflective surface has a transmittance smaller than a reflectance thereof, and
   wherein the semi-transmissive reflective surface is provided on the lens; and a ratio of a central portion thickness to a most peripheral portion thickness of an optically effective area of the lens is 1.5 or more and 4 or less,
   wherein a transmittance of the semi-transparent reflective surface at an incident angle of 0° is smaller than a transmittance thereof at least part of incident angles larger than 5°, and
   wherein the following condition is satisfied where T represents the transmittance of the semi-transparent reflective surface at the incident angle of 0°:

$25\% \leq T \leq 45\%$.

2. The optical system according to claim 1, wherein the lens is made of a resin material.

3. The optical system according to claim 1, wherein:
   the semi-transmissive reflective surface is provided on a surface of the lens; and
   the surface of the lens is a convex surface convex toward the display element.

4. The optical system according to claim 1, wherein:
   the semi-transmissive reflective surface is provided on a surface of the lens; and
   the surface of the lens is an aspheric surface.

5. The optical system according to claim 1, wherein the semi-transmissive reflective surface includes a layer formed of silver.

6. The optical system according to claim 1, wherein the transmittance of the semi-transmissive reflective surface increases from a central portion to a marginal portion of the semi-transmissive reflective surface.

7. The optical system according to claim 1, wherein, of at least one lens included in the optical system, a lens closest to the observer is a plano-convex lens having a convex surface convex toward the display element.

8. The optical system according to claim 1, wherein, when E represents an eye relief of the optical system, the following condition is satisfied:

$15 \text{ mm} \leq E \leq 25 \text{ mm}$.

9. The optical system according to claim 1, wherein, when L represents a thickness of the optical system in its optical axis direction, and E represents an eye relief of the optical system, the following condition is satisfied:

$0.6 \leq L/E \leq 1.0$.

10. The optical system according to claim 1, wherein, when E represents an eye relief of the optical system, and θ represents a maximum diagonal half-view angle of the optical system, the following condition is satisfied:

$8 \text{ mm} \leq E \times \tan \theta \leq 20 \text{ mm}$.

11. The optical system according to claim 1, wherein a slow axis of the first phase plate and a slow axis of the second phase plate are tilted to mutually opposite sides with respect to the polarization direction of the first linearly polarized light.

12. The optical system according to claim 1, wherein the optical system includes a polarizing plate disposed between the polarization beam splitter and the observer, the polarizing plate being configured to transmit the second linearly polarized light.

13. The optical system according to claim 1, wherein:
    non-polarized light is emitted from the display element; and
    the optical system includes a polarizing plate disposed between the display element and the first phase plate, the polarizing plate being configured to transmit the first linearly polarized light.

14. The optical system according to claim 1, wherein the transmittance of the semi-transmissive reflective surface increases as an incident angle of a light to the semi-transmissive reflective surface increases.

15. The optical system according to claim 1, wherein the number of lenses arranged in the optical system is 3 or less.

16. The optical system according to claim 1, wherein a lens arranged closest to the display element has a convex shape toward the display element in a paraxial area.

17. The optical system according to claim 1, wherein the following condition is satisfied:

$30\% \leq T \leq 45\%$.

18. An image display apparatus comprising:
    a display element; and
    an optical system configured to introduce light from the display element displaying an image to an observer,
    wherein the optical system comprises in order from the display element toward the observer:
    a first phase plate;
    a semi-transmissive reflective surface;
    a lens;
    a second phase plate; and
    a polarization beam splitter configured to reflect a first linearly polarized light and transmit a second linearly polarized light whose polarization direction is orthogonal to that of the first linearly polarized light, wherein the semi-transmissive reflective surface has a transmittance smaller than a reflectance thereof, and wherein the semi-transmissive reflective surface is provided on the lens; and a ratio of a central portion thickness to a most peripheral portion thickness of an optically effective area of the lens is 1.5 or more and 4 or less, wherein a transmittance of the semi-transparent reflective surface at an incident angle of 0° is smaller than a transmittance thereof at least part of incident angles larger than 5°, and wherein the following condition is satisfied where T represents the transmittance of the semi-transparent reflective surface at the incident angle of 0°:

$25\% \leq T \leq 45\%$.

* * * * *